(12) United States Patent
Calange

(10) Patent No.: US 8,033,712 B2
(45) Date of Patent: Oct. 11, 2011

(54) IMMERSION MIXER

(75) Inventor: Yves Calange, Montceau les Mines (FR)

(73) Assignee: Hameur S.A., Luxembourg (LU)

( * ) Notice: Subject to any disclaimer, the term of this patent is extended or adjusted under 35 U.S.C. 154(b) by 969 days.

(21) Appl. No.: 11/655,006

(22) Filed: Jan. 18, 2007

(65) Prior Publication Data
US 2007/0177453 A1    Aug. 2, 2007

(30) Foreign Application Priority Data

Jan. 20, 2006 (FR) ...................... 06 50210

(51) Int. Cl.
*A47J 43/044* (2006.01)
*A47J 43/07* (2006.01)

(52) U.S. Cl. ........................ 366/129; 366/331

(58) Field of Classification Search .................. 366/129, 366/331, 344; 99/348; 403/326, 344
See application file for complete search history.

(56) References Cited

U.S. PATENT DOCUMENTS

| | | | |
|---|---|---|---|
| 3,117,769 A * | 1/1964 | Werner | 366/129 |
| 5,810,472 A * | 9/1998 | Penaranda et al. | 366/129 |
| 5,836,684 A * | 11/1998 | Safont et al. | 366/129 |
| 6,186,056 B1 | 2/2001 | Bruno et al. | |
| 6,186,656 B1 * | 2/2001 | Penaranda et al. | 366/129 |
| 6,193,404 B1 * | 2/2001 | Calange | 366/129 |
| 6,293,691 B1 * | 9/2001 | Rebordosa et al. | 366/129 |
| 6,523,990 B1 * | 2/2003 | Lee | 366/129 |
| 6,974,244 B1 * | 12/2005 | Lin | 366/129 |
| 7,172,334 B2 * | 2/2007 | Chiappetta | 366/129 |
| 2004/0222326 A1 | 11/2004 | Naud et al. | |
| 2007/0177453 A1 * | 8/2007 | Calange | 366/129 |

FOREIGN PATENT DOCUMENTS

| | | |
|---|---|---|
| DE | 19729446 A1 | 1/1999 |
| EP | 1230883 A2 * | 8/2002 |
| EP | 1407701 A1 * | 4/2004 |
| EP | 0925010 B1 | 9/2004 |
| EP | 1 407 701 B1 | 1/2005 |
| ES | 2 179 711 A1 | 1/2003 |
| FR | 2770121 A1 * | 4/1999 |

(Continued)

OTHER PUBLICATIONS

GB Office Action dated Apr. 9, 2010 for Application No. GB0701045.7, 2 pages.
German Office Action dated Sep. 20, 2007 for Application No. DE102007002818.2-16, 4 pages.
Spanish Search Report dated Feb. 23, 2010 for Application No. ES 2,179,711, 5 pages.
French Search Report dated Aug. 22, 2006 for Application No. FR2896936, 2 pages.

*Primary Examiner* — Charles E Cooley
(74) *Attorney, Agent, or Firm* — Patterson Thuente Christensen Pedersen, P.A.

(57) ABSTRACT

The invention concerns an immersion mixer with an electric motor, a drive shaft, a tube, a bell-shaped housing and a rotary tool. To ease the assembly or disassembly of such a mixer, a cartridge is assembled in the bell-shaped housing so as to be removable. This cartridge includes a shaft guide body, an attaching mechanism, a sealed bearing assembly for receiving the shaft and a sleeve. The cartridge is made in such a way that it is simply necessary to insert or release it through the top of the bell-shaped housing without any action by a specialist in the field being needed.

12 Claims, 2 Drawing Sheets

FOREIGN PATENT DOCUMENTS

| | | | |
|---|---|---|---|
| FR | 2780264 A1 | | 12/1999 |
| FR | 2896394 A1 | * | 7/2007 |
| GB | 2434329 A | * | 7/2007 |
| GB | 2434329 | | 11/2010 |
| WO | WO 99/03388 | | 1/1999 |
| WO | WO 03003889 A1 | * | 1/2003 |

* cited by examiner

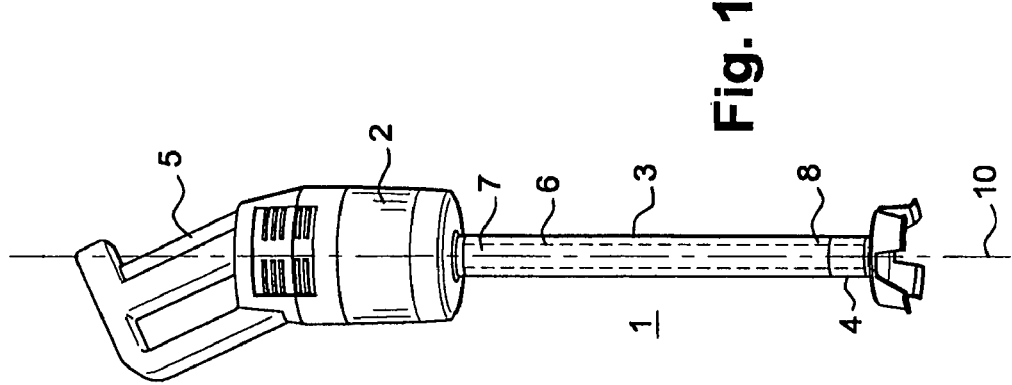
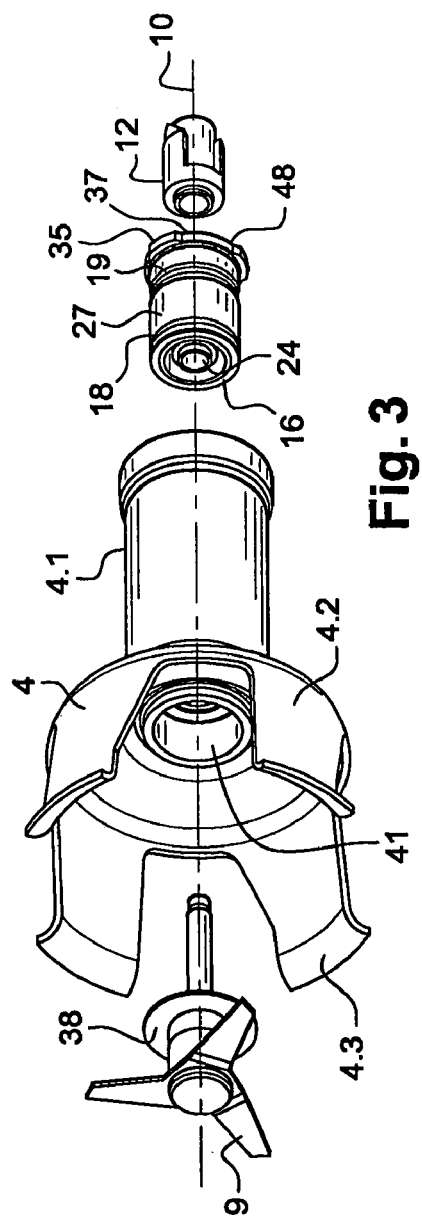

IMMERSION MIXER

RELATED APPLICATION

This application claims priority to French Application No. FR 06 50210 filed Jan. 20, 2006.

TECHNICAL FIELD

This invention concerns an electro-portable food-processing appliance or immersion mixer. In particular, it relates to improvements in the operation of such appliances and facilitating maintenance of the appliance.

BACKGROUND OF THE INVENTION

Maintenance of appliances may be necessary when a part is worn and needs replacing. Or maintenance may be necessary from the hygienic standpoint, if particles of food have gotten into the appliance during previous use, and need to be cleaned out. Processing appliances are intended for the hotel and restaurant industry and also for family or domestic use. Here, food refers to food in the form of liquids and/or in the form of particles. Food also refers to any type of preparation based on edible or inedible products. Inedible products refers to cosmetic or any other type of preparation. Accordingly, processing appliances can also be intended for use in the pharmaceutical or cosmetic industry, or any other type of industry liable to need such an appliance.

One such appliance has a drive shaft, a hollow tube, a bell-shaped housing and a rotary tool. The shaft is inserted through the tube and, at one end is connected to an electric motor driving the shaft in rotation and at an opposite end is connected to the rotary tool. The rotary tool is placed in a position corresponding to the bell-shaped housing. The bell-shaped housing may be removably assembled in a sealing manner onto the tube, and in particular, makes it possible to prevent the tool from touching the bottom or the wall of a recipient, and allows the material to be worked.

The bell-shaped housing forms a small portion compared to the tube that forms a large portion. The bell-shaped housing is generally one third to one quarter smaller in size than the tube. The tube and the bell-shaped housing form an overall length that is measured along the tube lengthwise axis. The lengthwise axis is the rotation axis of the appliance about which the tool is put into rotation. The tube and bell-shaped housing are designed for immersion into a food preparation to be processed, over a length corresponding to approximately two thirds of the total length, with the bell-shaped housing totally immersed in the preparation.

Patent No. EP 0 925 010 B1 describes such an appliance that includes a stem, a cylindrical bearing placed between the bell-shaped housing and the stem, a sealing means placed on the bearing, and an elastic bellows placed to bear against the stem and connected to the sealing means. The bearing enhances guidance and rotation of the stem with respect to the tube of the appliance. The bellows ensures that the appliance is tight. However, this type of appliance does represent drawbacks. In particular, when it is necessary to clean the appliance, extracting the stem from the bell-shaped housing may cause a deterioration of the bellows, and cleaning the inside of the bearing with a tool, for instance, a knife, can also cause damage to the bearing.

SUMMARY OF THE INVENTION

The invention proposes a solution to this problem. To achieve this, the invention provides for a monoblock cartridge to be mounted on the appliance, and assembled in the bell-shaped housing. This cartridge has a guide body forming a centering, guidance, and retaining means for the shaft placed between the bell-shaped housing and the shaft, means for forming a sealed bearing receiving the shaft, arranged between the shaft and the guide body, and at least one means for attaching the body to the bell-shaped housing.

In one embodiment of the invention, the shaft is made of two parts, a stem and a main cylindrical section. The stem supports the tool at one end and at another is connected to the cylindrical section, the cylindrical section being connected to the motor. When one of the cartridge components is worn, or it becomes necessary to clean the inside of the bell-shaped housing, it is simply necessary to separate an elongated part of the stem from a stem driving hub. Then, the cartridge can be withdrawn from the bell-shaped housing. Finally, the bell-shaped housing, less the cartridge, can be cleaned without any risk of damage to the components designed to work together with the stem and the cartridge can be replaced by a new one if necessary.

The invention is an advantageous way for a user or consumer not specializing in the field of this equipment to disassemble or assemble himself the appliance with relative ease.

Therefore, one embodiment of the invention is a food processing appliance comprising: an electric motor, contained in a housing with the motor connected to a drive shaft; a hollow tube through which the drive shaft is inserted by a first end of the tube; a bell-shaped housing connected to the hollow tube to a second end of the tube; and a rotary tool attached to the shaft and mounted in the bell-shaped housing. The appliance also includes a monoblock cartridge mounted in the bell-shaped housing, the cartridge having a guide body forming a centering, guidance and retaining means of the shaft arranged between the bell-shaped housing and the shaft, means forming a sealed bearing receiving the shaft, said means being arranged between the shaft and the guide body, and at least one attaching means of the body to the bell-shaped housing.

In an alternative embodiment of the invention, the bell-shaped housing and the tube form two separate parts. The bell-shaped housing and the tube are assembled to be removable with respect to one another. In this way, the assembly and disassembly processes of the appliance are facilitated. Assembly and disassembly can be performed by a person who is or who is not specialized in the field of the appliance. Except for the handling of the rotary tool for assembly, it is simply necessary to nest the parts into one another without any special tools being necessary.

DESCRIPTION OF THE DRAWINGS

The invention will be better understood from reading the following description and examination of the accompanying illustrations. The figures are included as illustrations only and must not be considered as limiting the invention in any way. These figures show:

FIG. 1 is a schematic representation of an immersion mixer, according to one embodiment of the present invention;

FIG. 3 is a schematic representation of an assembly process of an immersion mixer, according to one embodiment of the present invention.

DETAILED DESCRIPTION

Figure 2:
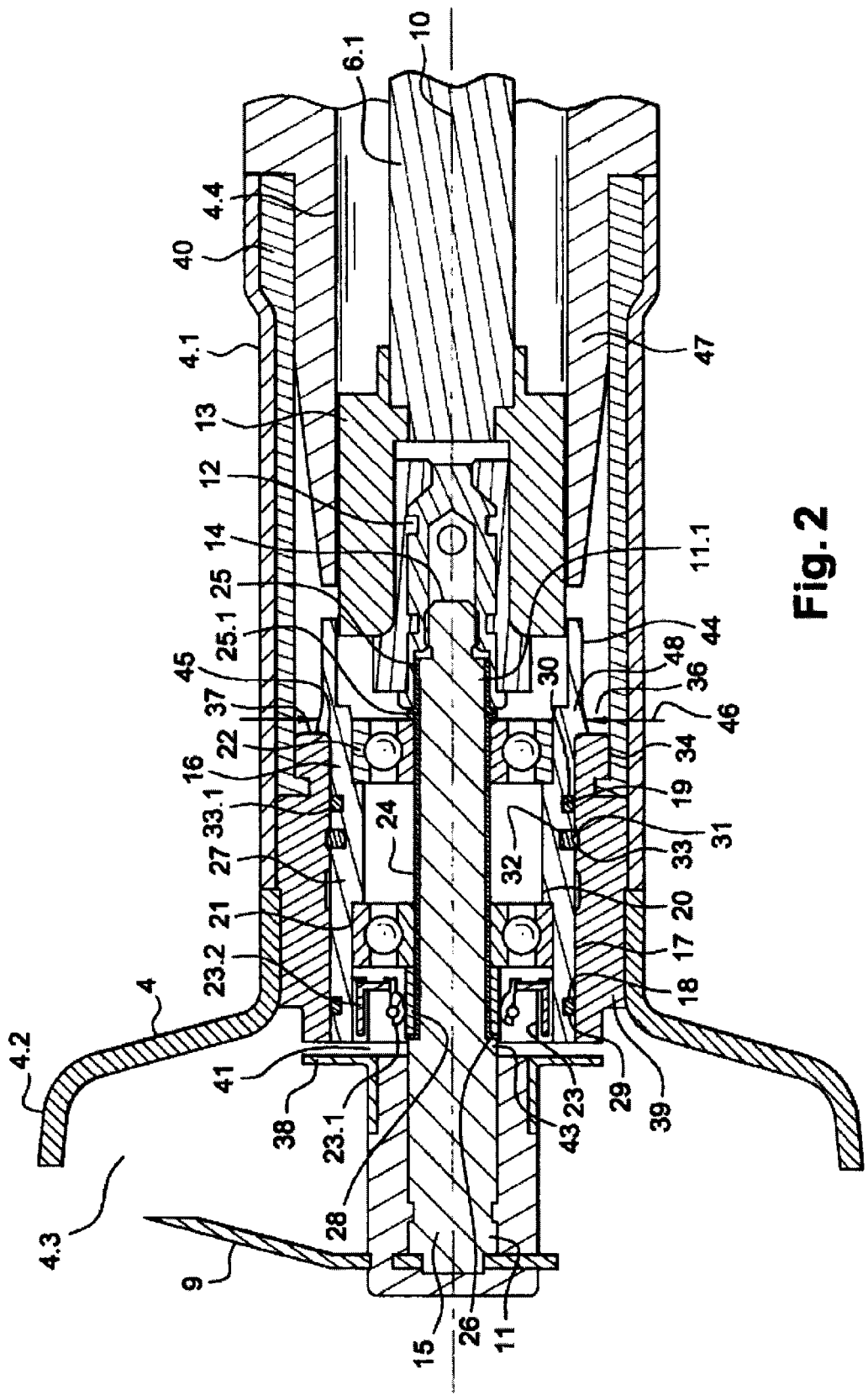
FIG. 2 is a sectional view of an immersion mixer, according to one embodiment of the present invention.

FIG. 1 illustrates an immersion mixer 1, according to one embodiment of the present invention. Mixer 1 includes a housing 2, a hollow tube 3, and an inside bell-shaped housing 4. Housing 2 encloses an electric motor (not shown). In the upper part of housing 2 there is a built-in handle 5 which may include a motor operation control switch. The motor is connected to a drive shaft 6. This drive shaft 6 is housed inside tube 3 and inside bell-shaped housing 4. Shaft 6 is located in tube 3 with a lengthwise axis of shaft 6 coaxial with a tube lengthwise axis 10. As depicted in FIG. 1, at one end, shaft 6 is attached to the motor, and as depicted in FIG. 2, at an opposite end is connected to a rotary tool 9. The lengthwise axis of the shaft is coaxial with the lengthwise axis 10 of the tube. The shaft lengthwise axis is a rotation axis of the appliance about which the tool is put into rotation.

Still referring to FIG. 1, tube 3 has an upper end 7 and a lower end 8. Lower end 8 of tube 3 is opposite to the upper end 7, placed longitudinally with respect to lengthwise axis 10 of tube 3. Tube 3 is attached by its upper end 7 to housing 2 and connected at lower end 8 to bell-shaped housing 4. Here, the term "connected" indicates that bell-shaped housing 4 is attached to tube 3 so that bell-shaped housing 4 and tube 3 form a monoblock part. The term connected also means that bell-shaped housing 4 is assembled to be removable from tube 3 so that bell-shaped housing 4 and tube 3 form two distinct parts that can be separated.

Bell-shaped housing 4 is between one third and one quarter the length of tube 3. Bell-shaped housing 4 and tube 3 form a total length measured along lengthwise axis 10 of tube 3. Tube 3 and bell-shaped housing 4 are designed to be immersed in a food preparation to be processed over a length corresponding to two thirds of the total length, bell-shaped housing 4 being designed to be immersed entirely in the preparation.

Bell-shaped housing 4 forms a bell shape connected to lower end 8 of tube 3. Bell 4 includes a tubular portion 4.1 and a flared portion 4.2. Bell 4 prevents tool 9 from touching the bottom or walls of the recipient and allows the material to be processed. Flared portion 4.2 specifically encloses rotary tool 9. Bell-shaped housing 4 can be assembled to be removable from tube 3 by means of tubular portion 4.1 which works together with lower end 8 of the tube to attach bell-shaped housing 4 and tube 3 to one another. To do this, bell-shaped housing 4 and tube 3 may include attaching means allowing them to be secured to one another. In particular, bell-shaped housing 4 may include along an inner surface of tubular portion 4.1, a plastic coating 40 with a shape designed specifically to work together with tube 3. But, bell-shaped housing 4 may include other similar attaching means suitable for working together with tube 3.

Referring now to FIGS. 2 and 3, bell-shaped housing 4 encloses rotary tool 9. In one embodiment, rotary tool 9 may have a cutting edge. In this case, rotary tool 9 forms at least one transverse cutting edge designed to chop food. In one embodiment, this tool could consist of three blades extending axially out of lengthwise axis 10 of tube 3. Tool 9 can also be formed by at least one elongated arm for mixing the foods together, or by other types of equivalent food processing tools designed for cutting, mixing or emulsifying the food.

As mentioned previously, food refers to any type of material that can be processed by a such appliance, for instance, edible or inedible products. Inedible products may refer to, for instance, cosmetics based on creams or powders, or other products. Here, food also refers to food in the form of particles and/or in the form of liquids.

Shaft 6 is formed of a main cylindrical section 6.1 and of a stem 11. Section 6.1 is attached to the motor and removably connected to stem 11. The section is located in tube 3 and possibly partly in bell-shaped housing 4. The stem is located in bell-shaped housing 4.

Rotational driving of tool 9 by shaft 6 is through stem 11. Moreover, it is stem 11 that carries tool 9. Stem 11 and tool 9 are assembled to be removable from bell-shaped housing 4. Stem 11 also has a lengthwise axis 11 which is coaxial with lengthwise axis 10 of the shaft. Stem 11 has an elongated section 11.1 and a drive hub 12. Elongated section 11.1 is removably attached to hub 12 at a rear end 14 of elongated section 11.1 and to bearing tool 9 at a front end 15 of elongated section 11.1. Rear end 14 is longitudinally opposite front end 15, along lengthwise axis 10.

Longitudinally with respect to axis 10, stem 11 is smaller than main cylindrical section 6.1 and is placed in bell-shaped housing 4. Stem 11 is removably connected to main cylindrical section 6.1. For this purpose, main cylindrical section 6.1 includes a coupling cage 13 connected to hub 12 to create a mechanical link and a driving link between elongated section 11.1 of stem 11 and main cylindrical section 6.1. This mechanical link is obtained by means of ensuring a rotational link of elongated section 11.1 of stem 11 with main cylindrical section 6.1. Main cylindrical section 6.1 may be partially inserted through tubular portion 4.1 of bell-shaped housing 4 to allow interconnection between stem 11 and main cylindrical section 6.1 in bell-shaped housing 4. Connected in this way, main cylindrical portion 6.1 can thus transmit a rotational movement to stem 11.

According to the present invention, mixer 1 also includes a monoblock cartridge 27 assembled in bell-shaped housing 4. Cartridge 27 includes a guide body 16 forming a centering, guidance and retention means of shaft 6, arranged between bell-shaped housing 4 and shaft 6. Cartridge 27 also includes means for forming a sealed bearing around stem 11 including 21, 22, and 23 arranged between shaft 6 and guide body 16, and for attaching body 16 to bell-shaped housing 4. According to the invention, cartridge 27 is assembled to be removable in bell-shaped housing 4. But cartridge 27 could be assembled permanently in bell-shaped housing 4. In the preferred embodiment of FIG. 2, cartridge 27 is arranged around elongated section 11.1 of stem 11. But, this cartridge could be placed anywhere on shaft 6.

Body 16 forms a cylinder having an outer face 17 on which external sealing means are positioned, such as 18 and 19, by means of which body 16 works together with bell-shaped housing 4 to provide tightness for cartridge 27 with respect to bell-shaped housing 4. These sealing means also work together to attach cartridge 27 to bell-shaped housing 4. Body 16 includes an internal face 20, to which are attached the sealing means forming a sealed bearing accommodating the stem, such as 21, 22 and 23, through which body 16 works together with stem 11.

The external sealing means may be formed by at least an O-ring. In the example of FIG. 2, cartridge 27 has a first O-ring 18 and a second O-ring 19. Each of these seals forms a molded rubber ring. These seals work together with bell-shaped housing 4 and body 16 so that each of them provides static sealing and dynamic sealing between bell-shaped housing 4 and body 16. Each of the two seals 18 and 19 is arranged partially in corresponding peripheral grooves 29 and 30. Each of these grooves is formed from the outer face 17 of body 16. First seal 18 and second seal 19 are positioned respectively in groove 29 and in groove 30 so that the two seals are placed to bear against body 16 and against bell-shaped housing 4 when cartridge 27 is inserted into bell-shaped housing 4. That is why these external sealing means also contribute to attachment.

It is also possible to have these seals formed by bell-shaped housing 4 while being intended to be housed in grooves that would be formed from an inner face 34 of a housing 39 in bell-shaped housing 4. Housing 39 could also be of stainless steel and placed astride and lengthwise on tubular portion 4.1 of bell-shaped housing 4 and along the flared portion 4.2 of bell-shaped housing 4. Housing 39 forms a bore 41 through which cartridge 27 can penetrate. Housing 39 forms the internal face 34 containing more specifically bore 41.

To prevent the two seals 18 and 19 from breaking free from their respective housing, or to prevent these two seals from deteriorating when the cartridge is assembled, it can be arranged so that housing 39 has a chamfer 45 or a radius 45. In the preferred embodiment of the invention, this chamfer 45 is placed at the entry to housing 39 of bell-shaped housing 4, along which the outer seals slide when the cartridge 27 is inserted into housing 39 of bell-shaped housing 4. This chamfer or radius 45 is formed at entry 45 of housing 39 or at a point of housing 39 close to tube 3 or to end 8 of tube 3, longitudinally with respect to lengthwise axis 10, remote from rotary tool 9. Chamfer 45 is formed at a junction between internal face 34 and a surface provided by shoulder 37. But this chamfer can be situated at an opposite end of the housing, near tool 9 and remote from the end 8 of tube.

External sealing means 18 and 19 are designed to be placed to bear against the internal face 34 of housing 39 of bell-shaped housing 4. The external sealing means can comprise any other type of means that provide sealing, and possibly attachment, equivalent to those provided by O-rings.

The O-rings also contribute to recentering the cartridge while providing alignment on shaft lengthwise axis 10 of the main cylindrical section 6.1 lengthwise axis, with the lengthwise axis of the stem.

The means for forming a sealed bearing includes at least one internal sealing means 23. The term internal sealing refers to the sealing between the outside environment and the means forming the bearing. In the example of FIG. 2, the means for forming a sealed bearing is an internal seal 23. Other means equivalent to a seal can be used.

Internal seal 23 is formed by a plastic or elastomer material. Seal 23 can be formed by a lip seal forming a "U" which includes a flexible bearing edge referred to as lip 23.1 and another fixed portion 23.2. This refers to a lip seal. This seal could include more than one lip. But, this seal could be replaced by any other type of means providing an equivalent function. This seal 23 is designed for attachment to inner face 20 of body 16 by its fixed portion 23.2, and is intended to be placed in contact with, or to bear against, the cylindrical surface formed by stem 11 by its flexible portion 23.1.

Cartridge 27 is arranged around stem 11. But cartridge 27 could also be situated around section 6.1. In the one embodiment of the invention, cartridge 27 is locked in its translation inside bell-shaped housing 4 co-linearly with the lengthwise axis of stem 11, in one direction by stop 37 of the bell-shaped housing end, and in the opposite direction by at least one stopping means, such as at least one extruded ring 31, of cartridge 27, working together with at least one groove 33 in bell-shaped housing 4. The stopping means locks the body in bell-shaped housing 4 in such a way that cartridge 27 can be removed by moving the stopping means to unlock cartridge 27 and allow the withdrawal of cartridge 27 through bell-shaped housing 4.

Indeed, elastic-translation locking of cartridge 27 can be obtained with respect to lengthwise axis 10 in bell-shaped housing 4, from the housing to the tool, by bearing of a collar 48 consisting of the body of the cartridge against a shoulder 37 of bell-shaped housing 4 and from the tool to the housing by the bearing of at least one extruded ring 31 of cartridge 27 against a bearing surface 33.1 or a stop in housing 39. Collar 48 extends radially at least in part on a perimeter of the body in a direction opposite to the axis of stem 11 and is formed at one end of that body. Collar 48 is built in such a manner that the body is stretching at the point where the collar is formed. In one example, collar 48 is formed on a perimeter of a material formed by the body. Shoulder 37 is formed by housing 39. Cartridge 27 is retained along lengthwise axis 10 from housing 2 to tool 9 by means of collar 48 positioned to bear against shoulder 37. Locking cartridge 27 in translation in this way by the bearing of collar 48 against the shoulder guarantees that cartridge 27 does not come out of housing 39 and that cartridge 27 does not fall into the food preparation. This translation locking can also guarantee that main cylindrical section 6.1 is retained in tube 3 and in bell-shaped housing 4 without any risk of falling into the preparation. Translation locking also ensures that the tool is held at the right height with respect to bell-shaped housing 4. Cartridge 27 includes at least one extruded ring 31. Extruded ring 31 is placed in a peripheral notch 32 formed from outer face 17 of body 16. Extruded ring 31 is placed in notch 32 and emerges partially from outer surface 17 of body 16 and floats at least radially in notch 32. Extruded ring-31 positioned in this way with respect to notch 32 is designed to be placed to bear elastically, relatively perpendicularly, with respect to axis 10 against bearing surface 33.1 of housing 39 during the insertion of the cartridge into bell-shaped housing 4. In this way extruded ring 31 also works together with stopping the cartridge in rotation because of the friction of the extruded ring against housing 39.

Bearing surface 33.1 forms a plane perpendicular to lengthwise axis 10. This bearing surface 33.1 is formed by a groove 33 hollowed into inner face 34 of housing 39 of bell-shaped housing 4. As produced in the embodiment of FIG. 2, bearing surface 33.1 is made in such a way that the bearing of extruded ring 31 against this bearing surface 33.1 prevents cartridge 27 from being moved from tool 9 to housing 2 longitudinally with respect to lengthwise axis 10. Cartridge 27 and bell-shaped housing 4 could include other types of attaching means to provide a function equivalent to those of the extruded ring and the groove. For instance, the bell-shaped housing and cartridge could be attached by screwing, by a bayonet arrangement, or by a collar forming a stop.

In the embodiment described immediately above, cartridge 27 is therefore locked elastically by means of the extruded ring. But cartridge 27 could be stopped in a manner that is not elastic, for instance by a pin inserted through bell-shaped housing 4 and cartridge 27, transversally, or else by a setscrew also inserted through bell-shaped housing 4 and cartridge 27 (examples not illustrated).

To lock cartridge 27 in the opposite direction, that is from the housing to bell-shaped housing 4, cartridge 27 is placed to bear against shoulder 37 of bell-shaped housing 4. Indeed, a bearing surface formed by collar 48 of cartridge 27 is placed to bear against shoulder 37 of bell-shaped housing 4. The shoulder results from the shape of at least one niche 36 formed by the housing. Niche 36 forms shoulder 37. Shoulder 37 defines the recess. Cartridge 27 is placed to bear against this shoulder 37 through body 16. Cartridge 27 may also contain at least one self-rotating ear 35, as depicted in FIG. 3. Ear 35 is formed of collar 48 and extends radially and in the opposite direction to lengthwise axis 10. If the collar is partially peripheral, the collar will also play an anti-rotation part and the forming of the ear then becomes optional.

Cartridge 27 is therefore also stopped from rotating in bell-shaped housing 4 by the insertion of ear 35 in niche 36.

Niche 36 therefore has a shape that adjusts to the end of the body provided with the collar, and possibly the ear.

Extruded ring 31 and groove 33 on the one hand, and collar 48, ear 35 and shoulder 37 on the other, are positioned with respect to one another so that the insertion of cartridge 27 is preferably carried out by the top of bell-shaped housing 4, i.e. tubular portion 4.1 of bell-shaped housing 4 or by upper end 4.4 of bell-shaped housing 4. Upper end 4.4 of bell-shaped housing 4 is an end designed to work together with lower end 8 of tube 3. Bell-shaped housing 4 also has a lower end 4.3 designed to accommodate rotary tool 9 and which is kept away from lower end 8 of tube 3 with respect to upper end 4.4 of this end 4.

In one embodiment, it is possible to insert and withdraw cartridge 27 through lower end 4.3.

According to the invention, cartridge 27 also includes a sleeve 24 placed between elongated section 11.1 of stem 11 and the means forming sealed bearing 21, 22, and 23.

Sleeve 24 forms a case protecting the elongated section of stem 11 and covers at least a portion of elongated section 11.1 of stem 11 along which friction can occur. In particular, sleeve 24 covers at least a portion of the surface of elongated section 11.1 of stem 11 designed to work with flexible portion 23.1 of internal seal 23. But sleeve 24 may also cover a larger surface of elongated section 11.1 of stem 11. Preferably, sleeve 24 covers the entire surface of stem 11 designed to work together with the means, forming a sealed bearing as per FIG. 2.

Sleeve 24 forms a conduit or pipe attached to the elongated section 11.1 of stem 11. The term attached to the stem means that sleeve 24 is held on elongated section 11.1 of stem 11 by the binding forces that exceed the binding forces that exist between flexible portion 23.1 of internal seal 23 and sleeve 24 and ensure tightness between sleeve 24 and elongated section 11.1 of stem 11. Thus, sleeve 24 is attached to elongated section 11.1 of stem 11 so that the rotation of elongated section 11.1 of stem 11 causes sleeve 24 to rotate. Sleeve 24 forms a protection case on elongated section 11.1 of stem 11 and also forms a sealing means compared to the elongated section 11.1 of stem 11.

The means forming the reception sealed bearing also form means of facilitating the rotation of the stem elongated section 11.1 compared to body 16. In particular, these means that facilitate the rotation of the elongated section can be formed by at least one bearing such as 21 and 22, FIG. 2. But these means could be formed by any other means ensuring an equivalent function to that provided by the bearings. For instance, there could be a ring lined on the inside with a lubricating product, instead of the bearings, to work with the stem or the sleeve while being attached to the body.

In the case of FIG. 2, a first bearing 21 and a second bearing 22 are attached to the stem 11 or sleeve 24 and inner face 20 of body 16. The attachment of these bearings to the sleeve advantageously offers the locking of the sleeve in translation compared to body 16 of cartridge 27 along lengthwise axis 10. Internal seal 23 is held stationary, fixed by its fixed portion 23.2 on the body, and in contact with the sleeve or bearings through the other flexible portion 23.1 against sleeve 24. Internal seal 23 and sleeve 24 are unlikely to move longitudinally with respect to one another compared to axis 10. Locking sleeve 24 in translation in this way prevents any deterioration of internal seal 23, and especially any deterioration of the flexible portion of internal seal 23. Internal seal 23 is placed at a point of cartridge 27 near rotary tool 9 longitudinally with respect to axis 10 whereas the first bearing means 21 and the second bearing means 22 are located behind seal 23 with respect to axis 10, internal seal 23 being situated between tool 9 and the bearing means.

Sleeve 24 comprises at least one hardened or lined friction track 28. This track 28 is formed on a surface of the conduit formed by sleeve 24. This friction track 28 decreases the wear on sleeve 24 due to the friction of seal 23. This track is located at a point of sleeve 24 against which the friction takes place. In particular, track 28 is situated at a point of the sleeve conduit facing internal seal 23. Internal seal 23 is designed to be placed to bear on its flexible portion against this track. This track 28 may be obtained by local physical, chemical, heat or other treatment of the surface of sleeve 24 consisting in modifying a surface structure of the material formed by the sleeve conduit. Otherwise, track 28 may be obtained after the application of a coat of material to the conduit of sleeve 24. Some such treatments may be accumulated. The purpose of this treatment is to harden and/or decrease the track friction surface coefficient to minimize the wear and extend the internal sealing capacity. Other equivalent treatment methods can be used at this point to achieve this modification of the surface structure of the conduit formed by the sleeve.

Track 28 can also be the result of a ring mounted permanently on the conduit formed by sleeve 24. On the outer face of this ring in contact with flexible portion 23.1 of seal 23, it can be advantageous to apply at a least one of the treatment methods intended to improve the friction surface life of this ring.

Sleeve 24 includes, longitudinally with respect to lengthwise axis 10 leading from housing 2 towards tool 9, an upper end 25 and a lower end 26. Hardening track 28 can extend from lower end 26 of the sleeve, on the one hand, as far as the first bearing means 21, on the other. This track increases the lifetime of the sleeve and therefore of mixer 1. But, this track could extend all the way along the conduit of sleeve 24.

In one embodiment of the present invention, lower end 26 forms a dropped edge and upper end 25 forms a shoulder 25.1. The dropped edge extends radially with respect to the lengthwise axis in a direction opposite to it. This dropped edge can be obtained by riveting or by any other technique so that an equivalent shape can be obtained in the lower end. When the track is a ring, track 28 can also be sandwiched between the dropped edge of the sleeve and the first bearing. In this way, the track is also locked in longitudinal translation and rotation with respect to axis 10 and with respect to the seal. Lower end 26 forms a stop against which a widened shape 43 of the elongated section of stem 11 is placed. This widened shape 43 corresponds to a local increase in the diameter of the stem. Dropped edge 44 formed by lower end 26 helps with the tightness of stem elongated section 11.1 with respect to the sleeve by the pressing of the widened section 43 against dropped edge 44.

Shoulder 25.1 results from a deformation of the conduit formed by sleeve 24 so that this shoulder forms a collar extending all the way around lengthwise axis 10 perpendicular to lengthwise axis 10 and in a direction opposite to stem 11. Shoulder 25.1 can also be formed by stripping away a block of metal or any other means to obtain a stopping system equivalent to that of shoulder 25.1, for instance, an elastic ring. Or, shoulder 25.1 can be formed by stripping away any other type of material. Shoulder 25.1 is formed so that hub 12 is placed to bear against shoulder 25.1 longitudinally, with respect to lengthwise axis 10, while being attached to elongated section 11.1 of stem 11. Hub 12 is centered on part of the sleeve between shoulder 25.1 and rear end 14 of elongated section 11.1 of stem 11. Hub 12 is screwed onto elongated section 11.1 of stem 11 and placed to bear against shoulder 25.1. Upper end 25 also forms an end against which elongated section 11.1 of stem 11 is placed to bear longitudinally with respect to axis 10 of stem 11 from housing 2 towards tool 9.

Hub 12 also corresponds to another local increase in the diameter of stem 11. Sleeve 24 is connected to elongated section 11.1 of the stem so that stem 11 and sleeve 24 are integral in rotation, while the elongated section of stem 11 and the sleeve are immobilized in translation with respect to one another, and the sleeve also forms a sealing means with respect to stem 11. Stem 11 is attached to bell-shaped housing 4 while remaining removable.

Sleeve 24 is arranged as follows in body 16. Bearings 21 and 22 and sealing means 23 are first attached to inner face 20 of the body. Then the sleeve is placed to bear with the shoulder against second bearing 22. Friction track 28 forming a bush around the sleeve conduit is then positioned to bear against first bearing 21. Subsequently lower end 26 is formed to obtain the dropped edge. The ring forming track 28 is sandwiched between the dropped edge and the first bearing means. The sleeve is then retained on bearings 21 and 22.

Stem 11 includes a deflector 38 located between rotary tool 9 and cartridge 27. Deflector 38 forms a washer attached to the stem and which extends from stem 11 radially with respect to lengthwise axis 10 over a surface area covering at least one transversal section of internal seal 23. Deflector 38 deviates the flow of food and forms a screen against the insertion of food that could be insinuated, under the effect of the pressure flow, into the bearing means of cartridge 27. This deflector also forms a screen against any possible deterioration of internal seal 23 caused by the ejection pressure of fluid against seal 23. Accordingly, in one embodiment, it is arranged for the deflector to overhang cartridge 37 and housing 39. In the example of FIG. 2, deflector 38 forms a flat washer but could also assume other shapes to provide a similar function.

To prevent cartridge 27 from drifting towards tube 3 after the impact of tool 9 against the food, cartridge 27 may also have an upper collar 44 capable of bearing against coupling 47, forming a stop. Upper collar 44 is formed by the body from collar 48 while extending relatively longitudinally with respect to lengthwise axis 10 and in the direction of the housing. Coupling 47 forms an intermediate part capable of connecting bell-shaped housing 4 to tube 3. The bearing of cartridge 27 on the coupling makes it possible to lock cartridge 27 in height, in the direction of tube 3. Coupling 47 can be integral with tube 3 at end 8 of the tube.

The assembly process of one embodiment of a mixer of the present invention is depicted in FIG. 3. Cartridge 27 is first inserted into bore 41 of bell-shaped housing 4, through upper end 4.4 of bell-shaped housing 4 until extruded ring 31 bears in slot 33 and until collar 48, and possibly ear 35, bear against corresponding shoulder 37. Cartridge 27 is inserted into bell-shaped housing 4 with external face 17 of body 16 pressed against internal face 34 of housing 39.

Then, rotary tool 9 is assembled into cartridge 27, while elongated section 11.1 of stem 11 is inserted into cartridge 27. Elongated section 11.1 of stem 11 must slide until elongated section 11.1 is placed to bear against the lower end 26 of sleeve 24. To ensure better guidance of elongated section 11.1 through cartridge 27 during assembly, the conduit formed by sleeve 24 is preferably rigid.

Then driving hub 12 is attached to elongated section 11.1 of stem 11 through upper end 4.4 of bell-shaped housing 4. If bell-shaped housing 4 is removable with respect to tube 3, bell-shaped housing 4 comprising such a cartridge 27 and such a tool 9 is then attached to tube 3 while connecting stem 11 to main cylindrical section 6.1 fitted with a driving cage 13.

To disassemble this type of mixer, bell-shaped housing 4 is disassembled from tube 3, then elongated section 11.1 is disassembled from hub 12. Then, elongated section 11.1 is removed from bell-shaped housing 4 by pulling on elongated section 11.1 of stem 11 until the elongated section is extracted from cartridge 27. Cartridge 27 is removed from bore 41 of bell-shaped housing 4 through upper end 4.4 of bell-shaped housing 4. To do this, cartridge 27 is pushed, with the fingers of one hand, for instance, inserted through lower end 4.3 of bell-shaped housing 4, from tool 9 to housing 2, until extruded ring 31 elastically comes free of groove 33. Cartridge 27 is made to slide against internal face 34 of housing 39 as far as the extraction of cartridge 27 from bell-shaped housing 4.

The assembly of sleeve 24 and internal seal 23, locked in translation in body 16 of cartridge 27 along lengthwise axis 10 prevents any translation movements of the friction track of sleeve 24 with respect to flexible portion 23.1 of internal seal 23 in contact with the friction track. Translation locking of the track with respect to the seal prevents any deterioration of flexible portion 23.1 of the seal.

The present invention also includes methods of using a mixer of this type as described above.

For reasons of cost and ease of assembly, cartridge 27 may be assembled in an appliance whose bell-shaped housing 4 and tube 3 form a single monoblock part.

In some embodiments, the cartridge may or may not be equipped with a sleeve.

In one embodiment, track 28 may also be formed by elongated section 11.1 of stem 11 in the event track 28 results from local treatment of material formed by the stem. In another embodiment, track 28 may be produced by a ring attached to the elongated section of stem 11.

The invention claimed is:

1. A food-processing appliance comprising:
    an electric motor contained in a housing, the electric motor being connected to a drive shaft;
    a hollow tube through which the drive shaft is inserted at a first end of the tube;
    a bell-shaped housing connected to the hollow tube, the bell-shaped housing having an upper end and a lower end, wherein the upper end is coupleable with a second end of hollow tube to connect the hollow tube to the bell-shaped housing;
    a rotary tool attached to the shaft in the bell-shaped housing, such that the lower end of the bell-shaped housing houses the rotary tool; and
    a monoblock cartridge mounted in the bell-shaped housing, wherein the monoblock cartridge includes—
        a guide body forming centering, guidance and retaining means for the drive shaft, the guide body being positioned between the bell-shaped housing and the drive shaft,
        means for forming a sealed bearing receiving the shaft, said means being positioned between the shaft and the guide body, and being fixed to an internal face of the guide body,
        at least one means for attaching the guide body to the bell-shaped housing, and
        external sealing means positioned on an outer face of the guide body,
    wherein the monoblock cartridge is insertable through the bell-shaped housing by way of the upper end of the bell-shaped housing.

2. The appliance of claim 1, wherein the cartridge is removably mounted in the bell-shaped housing.

3. The appliance of claim 1, wherein the bell-shaped housing is removably connected to the second end of the hollow tube.

4. The appliance of claim 1, wherein the shaft is formed of a main cylindrical section and a stem, the main cylindrical section being positioned in the tube and the stem being positioned in the bell-shaped housing, wherein the stem is attached at a first end to the rotary tool and attached at a second opposite end to the main cylindrical section, and wherein the stem and tool are mounted so as to be removable within the bell-shaped housing.

5. The appliance of claim 1, wherein the cartridge is locked in translation co-linearly with a lengthwise axis of the drive shaft in one direction by a bell-shaped housing stop of the bell-shaped housing, and in an opposite direction by at least one cartridge stopping means engageable with the bell-shaped housing, and wherein the appliance further comprises locking means shiftable between a first position and an second position, wherein the guide body is locked in the bell-shaped housing when the locking means are in the first position, and the cartridge is removable from the bell-shaped housing by shifting the locking means from the first position to the second position thereby unlocking the cartridge to allow a withdrawal of the cartridge through the bell-shaped housing.

6. The appliance of claim 1, wherein the cartridge is locked longitudinally in translation along a lengthwise axis of the shaft running from the rotary tool towards the housing through the bearing of the cartridge body against a coupling, with the coupling connecting one end of the bell-shaped housing to the tube.

7. The appliance of claim 1, wherein the cartridge further comprises a sleeve positioned between the drive shaft, the guide body and the means for forming the sealed bearing, wherein the sleeve forms a conduit attached to the drive shaft.

8. The appliance of claim 7, wherein the means for forming the sealed bearing comprise at least one means to facilitate a rotation of the drive shaft with respect to the guide body, said means being positioned between the guide body and the sleeve while being attached to the guide body, and said means being used for attaching the sleeve to the body to stop the sleeve from translational movement with respect to the sealing means and from longitudinal movement with respect to a lengthwise axis of the drive shaft.

9. The appliance of claim 7, wherein the sleeve has a friction track against which the sealing means bears, the track being positioned to be immobile in translation with respect to the sleeve conduit and with respect to the sealing means, and the track being positioned to be immobile in rotation at least with respect to the sleeve conduit.

10. The appliance of claim 1, wherein the cartridge includes at least one first means of attachment and the bell-shaped housing includes at least a second means of attachment, so that the first means and the second means are engageable in such a way that the cartridge is locked in rotation in the bell-shaped housing.

11. The appliance of claim 1, wherein the shaft has a deflector located between the rotary tool and the cartridge, the deflector extending radially with respect to a tube-lengthwise axis from the drive shaft on a surface corresponding at least to a transversal section of a sealing means formed by the means for forming a sealed bearing.

12. A food-processing appliance comprising:
an electric motor;
a drive shaft operably coupled at a first end to the electric motor;
an elongate body forming a hollow tube, the hollow tube being adapted to receive a first portion of the drive shaft within a first end of the hollow tube such that the first portion extends coaxially within the hollow tube;
a bell-shaped housing operably connected to a second end of the hollow tube, the bell-shaped housing having an upper end and a lower end, wherein the upper end is coupleable with the second end of hollow tube to connect the hollow tube to the bell-shaped housing, and wherein a second portion of the drive shaft extends beyond the second end of the hollow tube within the bell-shaped housing;
a rotary tool operably coupled a second end of the drive shaft within the bell-shaped housing such that the lower end of the bell-shaped housing houses the rotary tool; and
a monoblock cartridge mounted in the bell-shaped housing, the monoblock cartridge including—
a guide body positioned between the bell-shaped housing and the drive shaft, the guide body being adapted to center, guide, and retain the drive shaft within the bell-shaped housing,
a sealed bearing assembly forming a sealed bearing for the drive shaft, wherein the sealed bearing assembly comprises at least one bearing and at least one seal, the sealed bearing assembly being positioned between the drive shaft and the guide body, and being fixed to an internal face of the guide body,
an attaching mechanism coupling the guide body to the bell-shaped housing, and
at least one external seal positioned on an outer face of the guide body
wherein the monoblock cartridge is insertable through the bell-shaped housing by way of the upper end of the bell-shaped housing.

* * * * *